United States Patent
Barfknecht et al.

(10) Patent No.: US 8,794,299 B2
(45) Date of Patent: Aug. 5, 2014

(54) 2-PASS HEAT EXCHANGER INCLUDING THERMAL EXPANSION JOINTS

(75) Inventors: Robert J. Barfknecht, Waterford, WI (US); Biao Yu, Racine, WI (US); LeRoy Goines, Racine, WI (US); Robert J. DeGroot, Milwaukee, WI (US); Peter C. Kottal, Racine, WI (US); Steven P. Meshenky, Racine, WI (US); Dan R. Raduenz, West Allis, WI (US)

(73) Assignee: Modine Manufacturing Company, Racine, WI (US)

( * ) Notice: Subject to any disclaimer, the term of this patent is extended or adjusted under 35 U.S.C. 154(b) by 871 days.

(21) Appl. No.: 11/711,455

(22) Filed: Feb. 27, 2007

(65) Prior Publication Data
US 2008/0202739 A1    Aug. 28, 2008

(51) Int. Cl.
*F28F 27/02*      (2006.01)

(52) U.S. Cl.
USPC ............ 165/41; 165/51; 165/52; 165/76; 165/103; 165/81; 165/82; 165/83; 165/143; 165/144; 165/145; 165/158; 165/159; 165/160; 165/174; 165/176; 123/568.12; 60/320

(58) Field of Classification Search
USPC ............. 165/145, 82, 83, 176, 103, 143, 144, 165/158, 160, 81, 159, 174, 76, 41, 51, 52; 123/568.12; 60/320
See application file for complete search history.

(56) References Cited

U.S. PATENT DOCUMENTS

| | | | |
|---|---|---|---|
| 319,376 A | 6/1885 | Wood | |
| 1,347,436 A | 7/1920 | Baumann | |
| 1,594,199 A | 7/1926 | Heineman | |
| 1,604,197 A | 10/1926 | Rushmore | |
| 1,640,746 A * | 8/1927 | Braun | 165/143 |
| 1,789,880 A * | 1/1931 | Price | 165/145 |
| 1,798,354 A * | 3/1931 | Ris | 165/159 |
| 1,813,234 A * | 7/1931 | Dodd | 165/145 |
| 1,922,123 A | 8/1933 | Crater et al. | |
| 1,994,779 A * | 3/1935 | McNeal | 165/82 |
| 2,391,244 A * | 12/1945 | Jackson | 165/159 |
| 3,642,060 A * | 2/1972 | Hlinka | 165/83 |
| 3,792,729 A * | 2/1974 | Perry | 165/76 |
| 3,822,741 A | 7/1974 | Lippitsch | |
| 3,850,231 A | 11/1974 | Creek | |

(Continued)

FOREIGN PATENT DOCUMENTS

| | | | |
|---|---|---|---|
| JP | 05034091 A | * | 2/1993 |
| JP | 08247687 A | * | 9/1996 |

(Continued)

OTHER PUBLICATIONS

PCT/US2008/002628 International Search Report mailed Jun. 27, 2008, 3 pages.

(Continued)

*Primary Examiner* — John Ford
(74) *Attorney, Agent, or Firm* — Michael Best & Friedrich LLP

(57) ABSTRACT

A heat exchanger (10) is provided and in a highly preferred form is an EGR cooler (52) having first and second passes (56A,56B) that are connected to an inlet/outlet manifold (70) by a pair of corresponding thermal expansion joints (87,93) to allow differential thermal expansion between the various structural components of the heat exchanger (10).

18 Claims, 5 Drawing Sheets

(56) References Cited

U.S. PATENT DOCUMENTS

| | | | |
|---|---|---|---|
| 4,027,721 | A | 6/1977 | Gentry |
| 4,134,449 | A | 1/1979 | LaHaye et al. |
| 4,453,592 | A * | 6/1984 | Wightman ................ 165/82 |
| 4,685,430 | A * | 8/1987 | Ap ................... 123/142.5 R |
| 4,773,475 | A * | 9/1988 | Sleep, Jr. ................ 165/158 |
| 5,538,079 | A | 7/1996 | Pawlick |
| 5,657,817 | A | 8/1997 | Heine et al. |
| 5,676,200 | A | 10/1997 | Laveran |
| 5,927,387 | A * | 7/1999 | Nystrom ................ 165/145 |
| 6,129,142 | A | 10/2000 | Beldam |
| 6,460,610 | B2 | 10/2002 | Lambert et al. |
| 6,474,408 | B1 | 11/2002 | Yeh et al. |
| 6,807,955 | B2 | 10/2004 | Leedham et al. |
| 6,840,306 | B2 * | 1/2005 | Mota et al. ................ 165/158 |
| 6,918,598 | B2 | 7/2005 | Wilcox et al. |
| 6,942,027 | B2 | 9/2005 | Klotten et al. |
| 6,976,480 | B2 | 12/2005 | Miyoshi et al. |
| 7,089,998 | B2 | 8/2006 | Crook |
| 7,121,325 | B2 | 10/2006 | Kruger et al. |
| 7,255,158 | B2 | 8/2007 | Ozaki |
| 7,264,040 | B2 | 9/2007 | Bush et al. |
| 2005/0201653 | A1 | 9/2005 | Gilardi et al. |
| 2008/0011456 | A1 | 1/2008 | Meshenky |
| 2009/0020275 | A1 | 1/2009 | Neher et al. |

FOREIGN PATENT DOCUMENTS

| | | | |
|---|---|---|---|
| JP | 2003021487 A * | 1/2003 | |
| JP | 2005164084 | 6/2005 | |
| KR | 100119478 | 10/1997 | |
| KR | 1020060038193 | 5/2006 | |

OTHER PUBLICATIONS

Chinese Patent Application No. 200880006328.7 Office Action dated Aug. 11, 2010.

Second Office Action from the Patent Office of the People's Republic of China for Application No. 200880006328.7 dated Aug., 11, 2011 (28 pages).

* cited by examiner

2-PASS HEAT EXCHANGER INCLUDING THERMAL EXPANSION JOINTS

FIELD OF THE INVENTION

This invention relates to heat exchangers, and in more particular applications, heat exchangers having at least two passes, and in even more particular applications, to exhaust gas recirculation coolers having two passes.

BACKGROUND OF THE INVENTION

Emission concerns associated with the operation of internal combustion engines, generally, but not always, diesel engines, have resulted in an increased emphasis on the use of exhaust gas heat exchange systems with such engines, particularly, but not always, in vehicular applications. These systems are employed as part of an exhaust gas recirculation (EGR) system by which a portion of an engine's exhaust is returned to its combustion chambers via its intake system. The result is that some of the oxygen that would ordinarily be inducted into the engine as part of its fresh combustion air charge is displaced with inert gases thus reducing the rate of $NO_x$ formation. EGR systems are frequently designed to absorb heat from the combustion process, thus lowering its temperature and providing a further reduction in $NO_x$.

In many applications employing EGR systems, exhaust gas recirculation coolers are employed. In the usual case, engine coolant is brought into heat exchange relation with the exhaust gas prior to its recirculation so as to lower its temperature. While many of the known coolers may work well for their intended purpose, there is always room for improvement.

SUMMARY OF THE INVENTION

In accordance with one feature of the invention, an improvement is provided in an engine system including a combustion engine and a cooling system. The improvement includes an exhaust gas cooler for cooling an exhaust gas flow of the engine by directing the exhaust gas through first and second passes relative to a coolant flow of the cooling system. The cooler includes an inlet/outlet manifold to direct the exhaust gas to the first pass and from the second pass; a turning manifold to direct the exhaust gas from the first pass to the second pass; a first exhaust gas core defining the first pass and having a first end connected directly to one of the manifolds and an opposite end connected to the other of the manifolds by a first thermal expansion joint or device; a second exhaust gas core defining the second pass and having a first end connected directly to one of the manifolds and an opposite end connected to the other of the manifolds by a second thermal expansion joint or device; and a coolant housing fixed at opposite ends to the manifolds and surrounding the first and second cores and the first and second thermal expansion joints to direct the coolant flow past the first and second exhaust gas cores.

As one feature, the first and second thermal expansion joints are connected to the same manifold. As a further feature, the same manifold is the inlet/outlet manifold.

In accordance with one feature of the invention, a heat exchanger is provided for transferring heat between a fluid flow and a coolant flow. The heat exchanger includes a coolant housing, first and second cores in the housing, first and second manifolds, and first and second thermal expansion joints in the housing. The housing defines a coolant flow path through the heat exchanger. The first core has opposite ends and defines a first pass for the fluid flow through the housing. The second core has opposite ends and defines a second pass for the fluid flow through the housing. The first manifold directs the fluid flow to one of the first and second cores and receives the fluid flow from the other of the first and second cores. The first manifold is fixed to a first end of the housing. The second manifold receives the fluid flow from the one of the first and second cores and directs the fluid flow to the other of the first and second cores. The second manifold is fixed to a second end of the housing. A first thermal expansion joint or device is connected between one of the ends of the first core and one of the first and second manifolds to direct the fluid flow therebetween. The other end of the first core is fixed to the other of the first and second manifolds. A second thermal expansion joint or device is connected between one of the ends of the second core and one of the first and second manifolds to direct the fluid flow therebetween. The other end of the second core fixed to the other of the first and second manifolds.

As one feature, the first and second thermal expansion joints are connected to the same manifold. As a further feature, the same manifold is the first manifold.

In accordance with one feature of the invention, a heat exchanger is provided for transferring heat between a coolant flow and a fluid flowing through first and second passes. The heat exchanger includes an inlet/outlet manifold to direct the fluid flow to the first pass and from the second pass; a turning manifold to direct the fluid flow from the first pass to the second pass; a first core defining the first pass and having a first end connected directly to the inlet/outlet manifold and an opposite end connected to the turning manifold by a first thermal expansion joint or device; a second core defining the second pass and having a first end connected directly to the inlet/outlet manifolds and an opposite end connected to the turning manifold by a second thermal expansion joint or device; and a coolant housing fixed at opposite ends to the manifolds and surrounding the first and second cores and the first and second thermal expansion joints to direct the coolant flow past the first and second cores in heat exchange relation with the fluid flow in the first and second passes.

In one feature, the first and second cores extend parallel to each other and have equal lengths.

According to one feature, each of the first and second cores includes a plurality of parallel spaced heat exchange tubes with the interiors of the tubes defining the corresponding pass.

As one feature, a by-pass valve is mounted in the inlet/outlet manifold to allow selective bypassing of the exhaust gas around the first and second passes.

In one feature, the first and second thermal expansion joints include first and second bellows.

According to one feature, the first and second thermal expansion joints include first and second sliding O-ring joints.

Other objects, features, and advantages of the invention will become apparent from a review of the entire specification, including the appended claims and drawings.

DETAILED DESCRIPTION OF THE PREFERRED EMBODIMENTS

Figure 1:
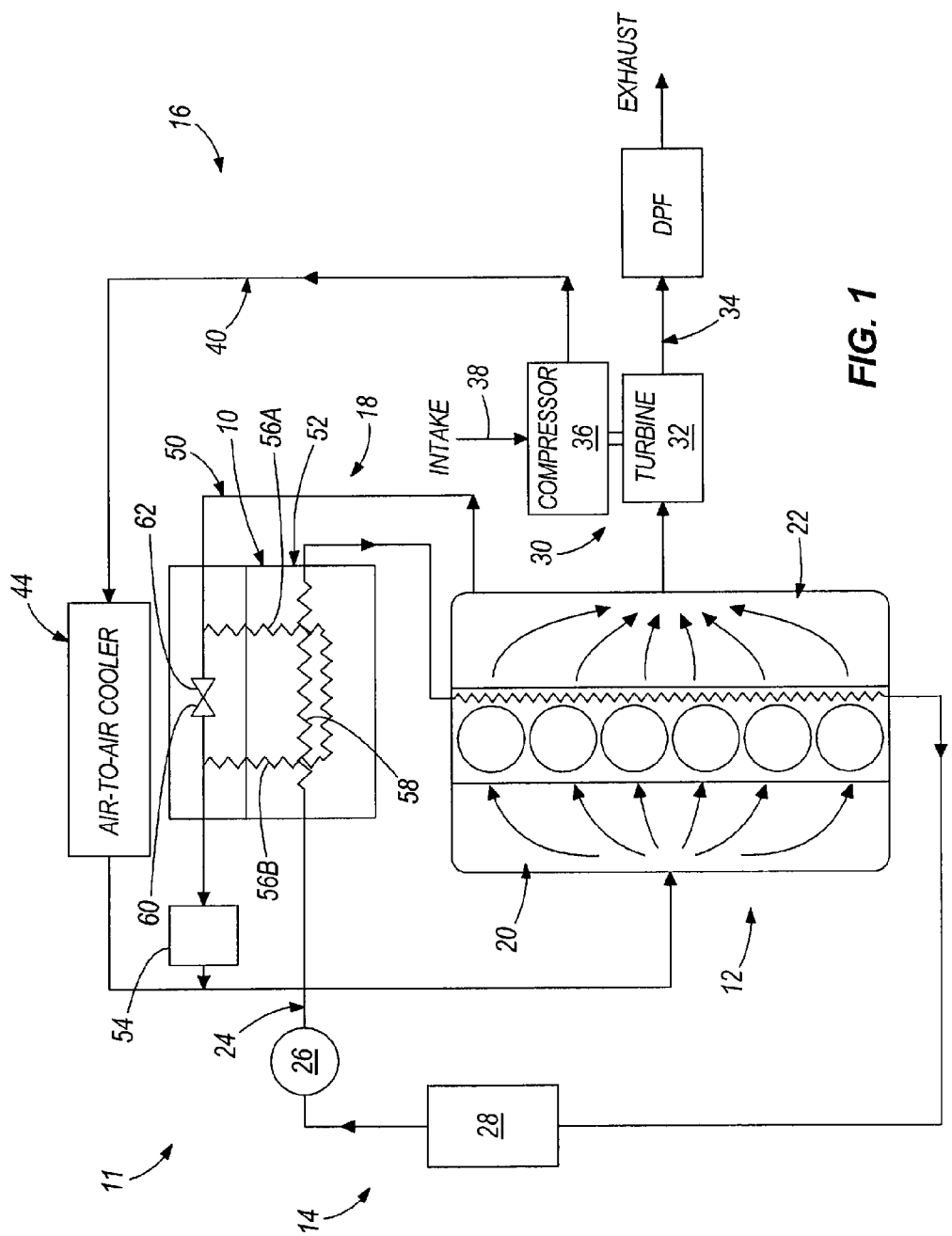
FIG. 1 is a schematic representation of an engine system including a heat exchanger embodying the present invention.

With reference to FIG. 1, a heat exchanger 10 is shown in a diagrammatic representation of an engine system 11 which includes an internal combustion engine 12, a cooling system 14, and a charge air system 16, and an exhaust gas recirculation system 18. The combustion engine 12 includes an intake 20 (typically an intake manifold) and an exhaust 22 (typically an exhaust manifold). The cooling system includes a coolant flow path 24, that may or may not pass through the engine 12 to provide cooling therefore, a pump 26 located somewhere in the flow path 24 for circulating a coolant flow, and a radiator 28 for rejecting heat from the coolant flow to another fluid, typically air. The charge air system 16 includes a turbine driven air compressor unit 30 having a turbine 32 connected to the exhaust 22 to be driven by an exhaust gas flow therefrom and connected to an exhaust path 34 to provide the exhaust flow thereto, and a compressor 36 connected to an air intake 38 to receive air therefrom and to a charge air flow path 40 to provide a pressurized charge air flow thereto. The charge air system 16 further includes an air-to-air charge air cooler 44 connected in the flow path 40 between the compressor 34 and the intake 20 to cool the charge air flow. The exhaust gas recirculation ("EGR") system 18 includes an exhaust gas recirculation flow path, shown generally at 50, the heat exchanger 10 in the form of an EGR cooler 52, and an EGR flow control valve 54. The cooler 52 includes a 2-pass exhaust gas flow path 56A,56B in heat transfer relation with a coolant flow path 58 of the coolant system 14 to transfer heat from the exhaust gas flow to the coolant flow. As a preferred option, the EGR system 18 further includes a bypass flow path 60 and a bypass control valve 62 to selectively bypass the exhaust flow around the exhaust gas flow path 56 in the cooler 52. As is known, the EGR flow path 50 connects with the charge air flow path 40 to provide cooled recirculated exhaust gas for mixing with the cooled charge air supplied to the intake 20 of engine 12.

It should be understood that the system 11 is provided in order to provide a context for a preferred form of the heat exchanger 10. It should also be appreciated that there are many possible configurations and constructions for the system 11, including for the engine 12, the cooling system 14, the charge air system 16, and the EGR system 18, with the most desirable configurations being highly dependent upon the parameters and requirements of each particular application. Accordingly, no limitations to a specific configuration of system 11, or any of its sub-systems is intended, unless expressly recited in the claims. Furthermore, it should be appreciated that while the invention is described herein in connection with EGR cooler 52, it may find use in many other applications. Accordingly, no limitation is intended to an EGR cooler unless expressly recited in the claims.

Figure 2:
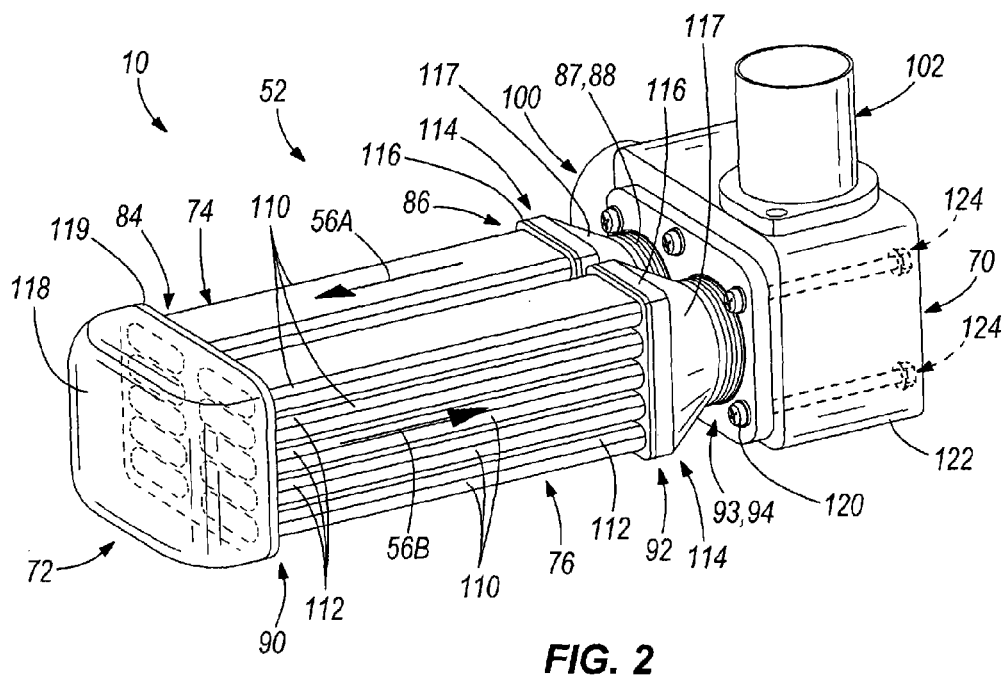
FIG. 2 is a perspective view of the heat exchanger of FIG. 1, with the coolant housing component removed so that the heat exchanger core components can be seen clearly, and with other of the exterior components being shown as somewhat transparent to allow illustration of certain interior components of the heat exchanger.

The exhaust gas cooler 52 is shown in more detail in FIGS. 2-5. With reference to FIG. 2, the cooler 52 includes an inlet/outlet manifold 70 to direct the exhaust gas to the first pass, shown schematically by arrow 56A, and from the second pass, shown schematically by arrow 56B, a turning manifold 72 to direct the exhaust gas from the first pass 56A to the second pass 56B, a first exhaust gas core 74 defining the first pass 56A, a second exhaust gas core 76 defining the second pass 56B, and a coolant housing 78 (not shown in FIG. 2) fixed at opposite ends 80 and 82 to the manifolds 70 and 72, respectively. The first core 74 has an end 84 connected directly to the turning manifold 72 and an opposite end 86 connected to the inlet/outlet manifold 70 by a first thermal expansion joint or device 87 in the form of a first bellows 88. The second core 76 has an end 90 connected to the turning manifold 72 and an opposite end 92 connected to the inlet/outlet manifold 70 by a second thermal expansion joint or device 93 in the form of a second bellows 94.

Figure 3:
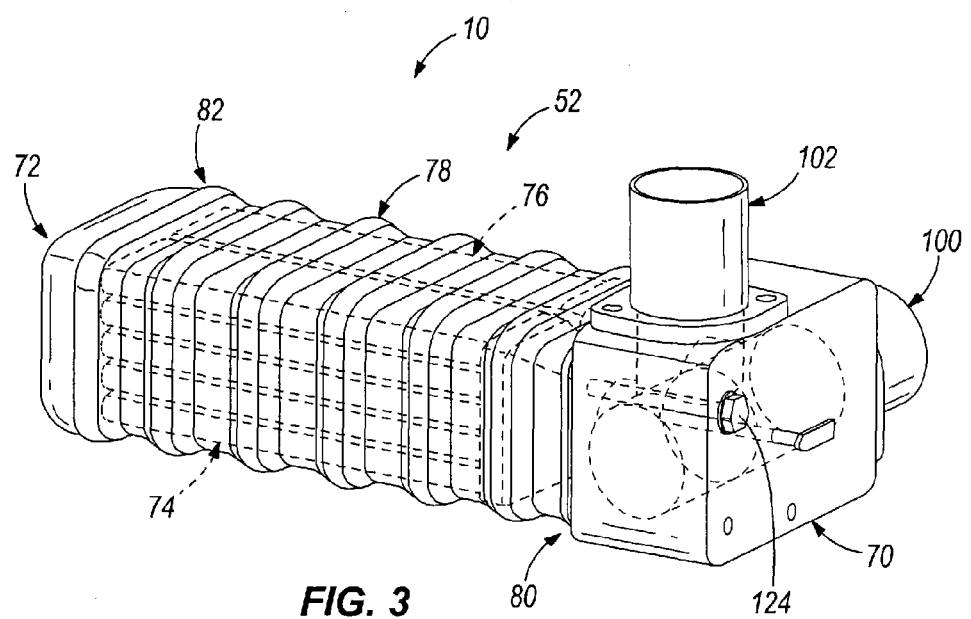
FIG. 3 is a perspective view from an opposite angle of that of FIG. 2, again with some of the exterior components being shown as somewhat transparent to allow illustration of interior components of the heat exchanger.
Figure 4:
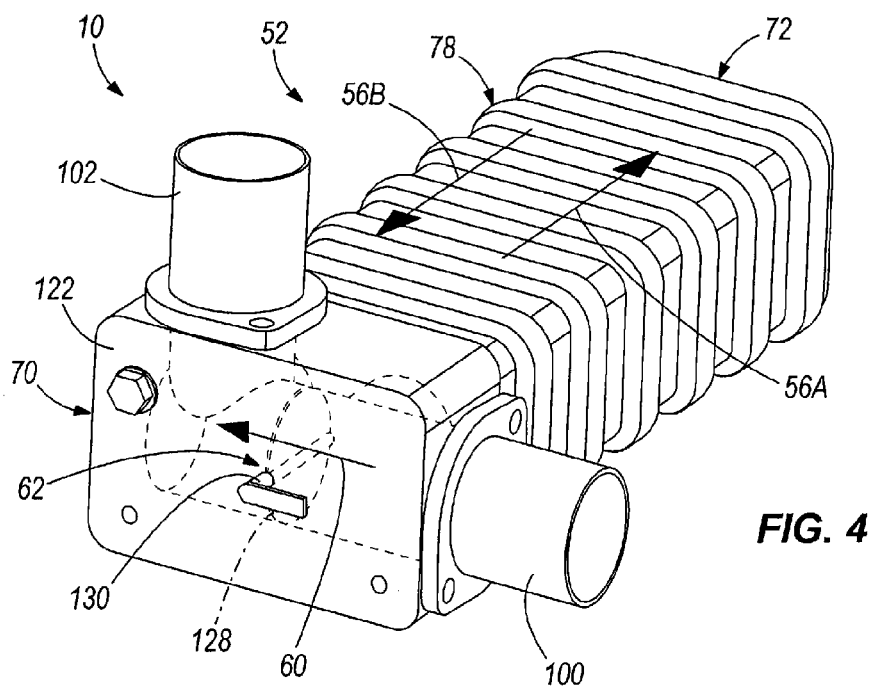
FIG. 4 is a perspective view similar to that of FIG. 3 but from an opposite side, again with some of the exterior components being shown as somewhat transparent.
Figure 5:
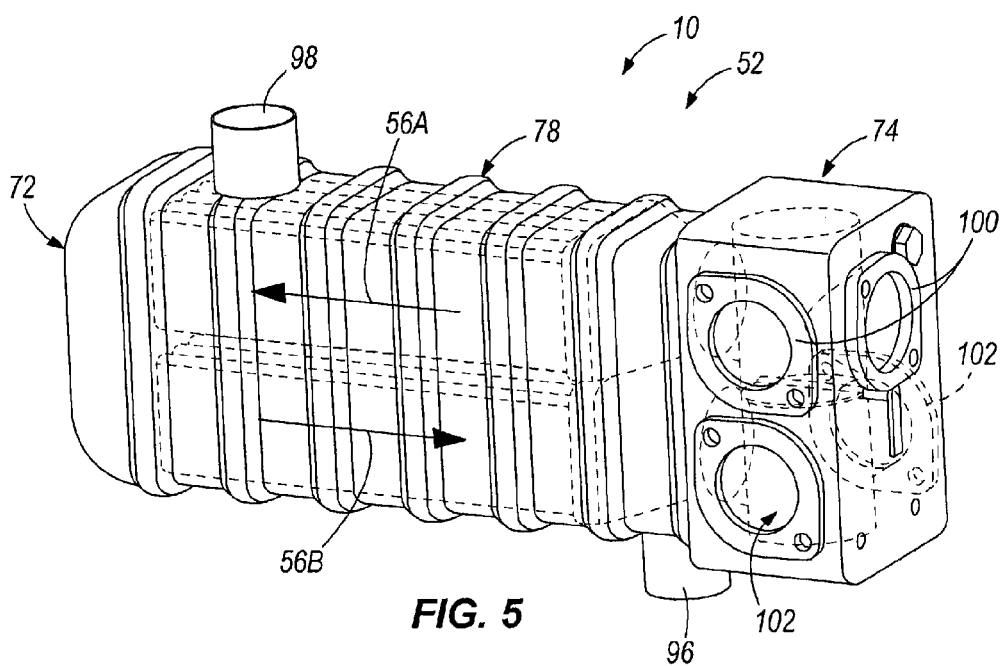
FIG. 5 is another perspective view from yet another angle of the heat exchanger, with some of the components of the heat exchanger being slightly modified to illustrate various possibilities for inlet and outlet ports for the working fluids of the heat exchanger, and again with some of the exterior components being shown as somewhat transparent.
Figure 6:
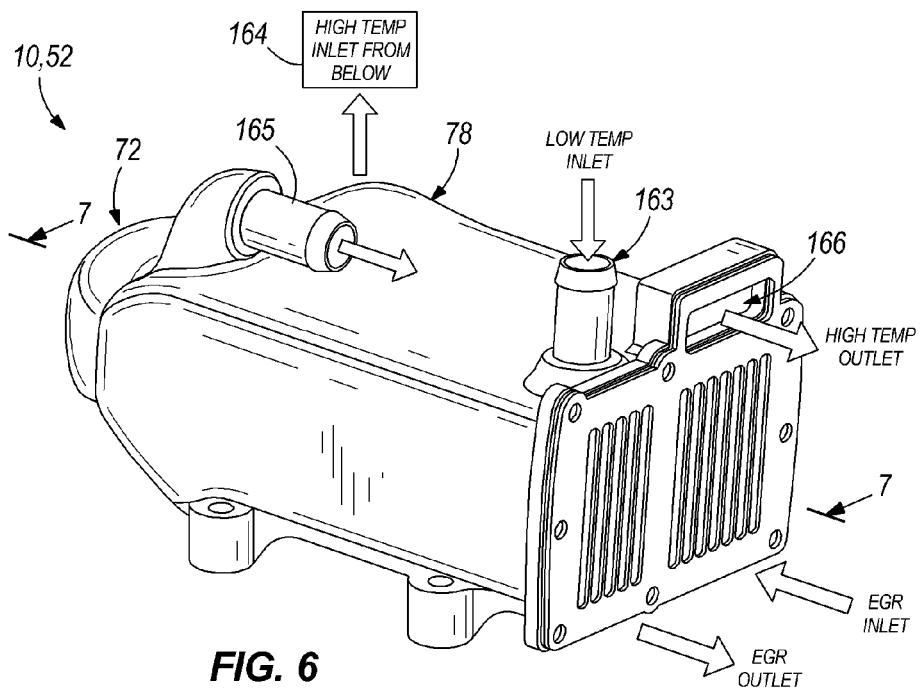
FIG. 6 is a perspective view of another embodiment of the heat exchanger of FIG. 1.

As best seen in FIGS. 3-5, the coolant housing 78 surrounds the first and second cores 74,76 and the first and second bellows 88,94 to direct the coolant flow in heat exchange relation with the first and second cores 74 and 76. In this regard, as best seen in FIG. 5, the coolant housing 78 is provided with a coolant inlet port 96 (not shown in FIGS. 3 and 4) and a coolant outlet port 98 (not shown in FIGS. 3 and 4) connected to the coolant flow path 24, and may preferably include a plurality of spaced baffles (not shown) that extend perpendicular to the passes 56A and 56B to direct the coolant flow for a localized cross flow relative to the passes 56A and 56B, as is known. As another option, coolant fins can be located between the tubes of the cores 74 and 76, with the spaced baffles being eliminated, so that the coolant flow has a parallel flow relation to the passes 56a and 56b and the exhaust flow therein. As best seen in FIGS. 2 and 3, the inlet/outlet manifold 70 includes an exhaust gas inlet port 100 and an exhaust gas outlet port 102.

It should be appreciated that because the coolant housing 78 is fixed at opposite ends 80 and 82 to the manifolds 70 and 72, a problem can arise with respect to differential thermal expansion of the relatively cool coolant housing 78 in comparison to the relatively hot cores 74 and 76 because of the hot exhaust gas flowing through the cores 74 and 76 in comparison to the relatively cool coolant flowing through the coolant housing 78. Furthermore, it should be appreciated that because the exhaust gas in the second pass 56B will be relatively cooler than the exhaust gas in the first pass 56A, the first and second cores 74 and 76 will also have differential thermal expansion relative to each other. The first and second thermal expansion joints 87 and 93 in the form of the bellows 88 and 94 allow for all of the above-described differential thermal expansions to occur while minimizing the stresses that would otherwise occur in the components of the heat exchanger 52 as a result of such differential thermal expansion.

With reference to FIG. 2, it can be seen that each of the cores 74 and 76 preferably includes a plurality of spaced, parallel extending, flattened heat exchanger tubes 110 which direct the exhaust gas flow through their interiors in heat exchange relation with the coolant flow, which passes over the exteriors of the tubes 110 in the spaces 112 between adjacent tubes 110 and between the tubes 110 and the housing 78. Each of the cores 74 and 76 will further include a core manifold 114 that directs the exhaust flow between the corresponding bellows 88,94 and tubes 110. The manifold 114 preferably includes a header plate 116 sealingly receiving the ends of the tubes 110, and a transition piece 117.

While there are many possible configurations, the turning manifold 72 will preferably include a tank 118 connected to a heater plate 119 that sealingly receives the ends of the tubes 110. The inlet/exhaust manifold 70 will preferably include a bellows plate 120 that sealingly receives the ends of the bellows 88 and 94 and can be connected to a tank 122 of the inlet/outlet manifold 70 using suitable fasteners 124, with a suitable seal or gasket (not shown) sandwiched between the plate 120 and the tank 122. Additionally, (as best seen in FIG. 4) the bypass valve 62 may be mounted in the tank 122, and have any suitable form, such as the illustrated butterfly-type valve 128 that is mounted on an axle 130 to pivot between a closed position, shown in FIG. 3 that prevents bypassing of the exhaust gas flow through the flow path 60 around the first and second passes 56A and 56B, to a fully open position wherein the valve 128 is rotated 90° to allow complete bypassing of the exhaust gas flow through the path 60 around the first and second passes 56A and 56B.

With reference to FIG. 5, it can be seen that the cooler 52 can be arranged so that the first and second passes 56A and 56B have a vertical side-by-side relationship rather than the horizontal relationship shown in FIGS. 2-4, and the coolant flow can be arranged so that the coolant inlet and outlet ports 96, 98 are also vertical.

Figure 7:
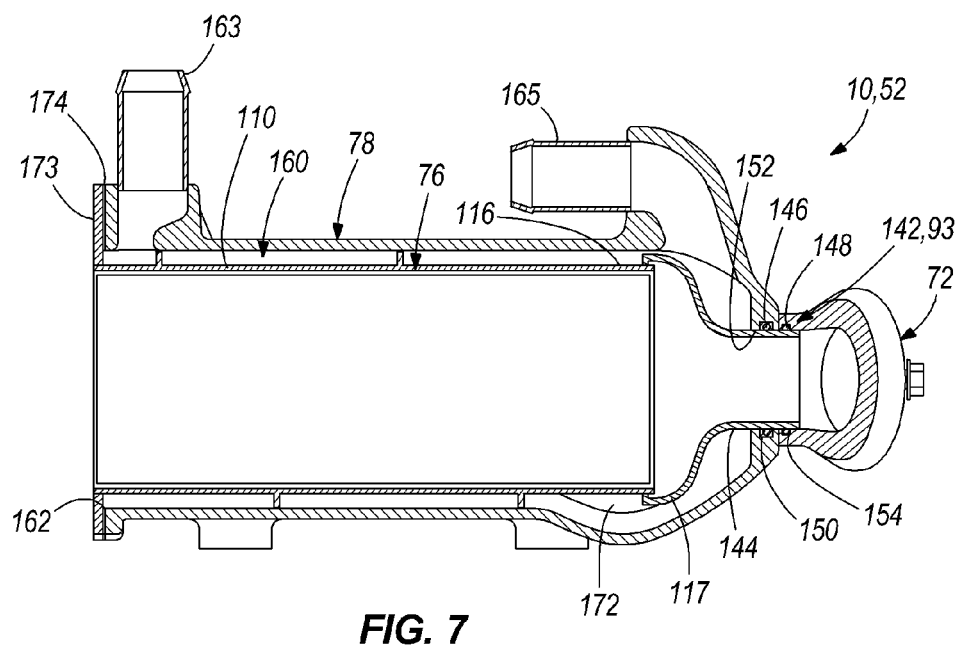
FIG. 7 is a section view taken from line 7-7 in FIG. 6.
Figure 8:
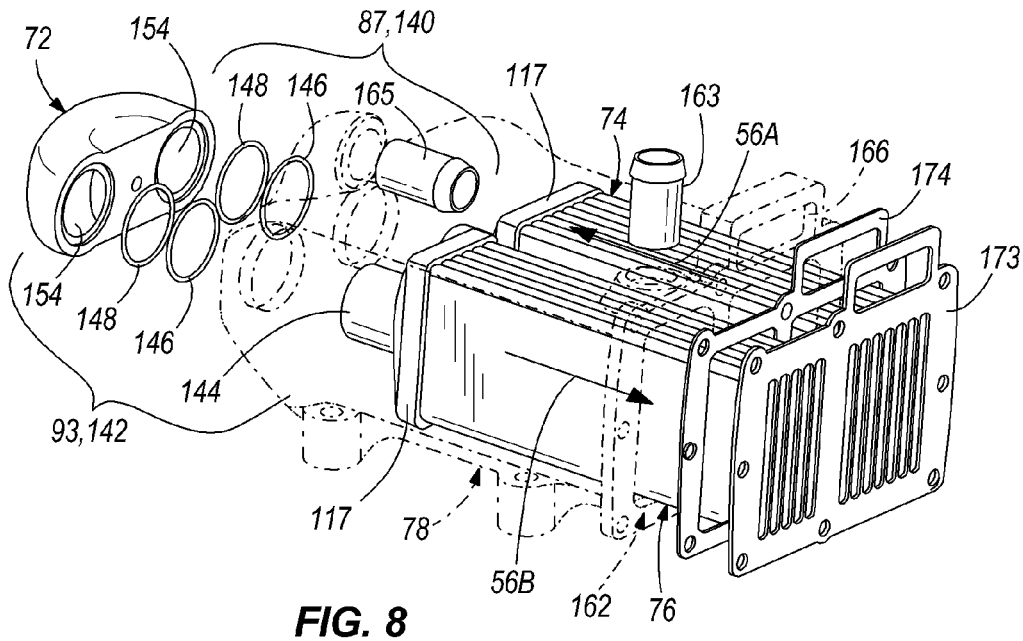
FIG. 8 is a perspective view of selected core, manifold, housing, and thermal expansion joint components of the heat exchanger of FIG. 6, with a coolant housing shown in phantom.

With reference to FIGS. 6-9, another embodiment of the heat exchanger 10/exhaust gas cooler 52 is shown wherein like reference numbers indicate like components or features. As best seen in FIGS. 7-8, this embodiment of the heat exchanger 10/exhaust gas cooler 52 differs from those shown in FIGS. 2-5 in that the first and second thermal expansion joints or devices 87 and 93 are provided in the form of sliding O-ring joints 140 and 142, rather than the bellows 88 and 94 of FIGS. 2-5, and in that the thermal expansion joints 87 and 93 are provided at the ends of the cores 74,76 adjacent the turning manifold 72, rather than adjacent the inlet manifold 70 as in the embodiments of FIGS. 2-5.

For each of the sliding O-ring joints 140 and 142, the transition piece 117 of each of the manifold 114 is provided with an elongated cylindrical extension 144 that is slidingly engaged with a pair of O-ring seals 146 and 148. As best seen in FIG. 7, the O-ring seal 146 is contained within a seal groove 150 formed in a cylindrical opening 152 of the coolant housing 78, and the O-ring seal 148 is received in a seal groove 154 provided in the turning manifold 72. It should be appreciated that while FIG. 7 shows the sliding O-ring joint 142, the construction is the same for the sliding O-ring joint 140. For both of the O-ring joints 140 and 142, the O-ring seals 146 and 148 prevent leakage of the coolant and exhaust gas, respectively, while allowing the cylindrical extension 144 to slide longitudinally relative to the housing 78 and turning manifold 72 in response to differential thermal expansion between the housing 78 and the cores 74 and 76. Thus, as with the bellows 88 and 94, the sliding O-ring joints 140 and 142 allow for the previously described differential thermal expansion to occur while minimizing the stresses that would otherwise occur in the components of the heat exchanger 10/exhaust gas cooler 52 as a result of such differential thermal expansion.

Figure 9:
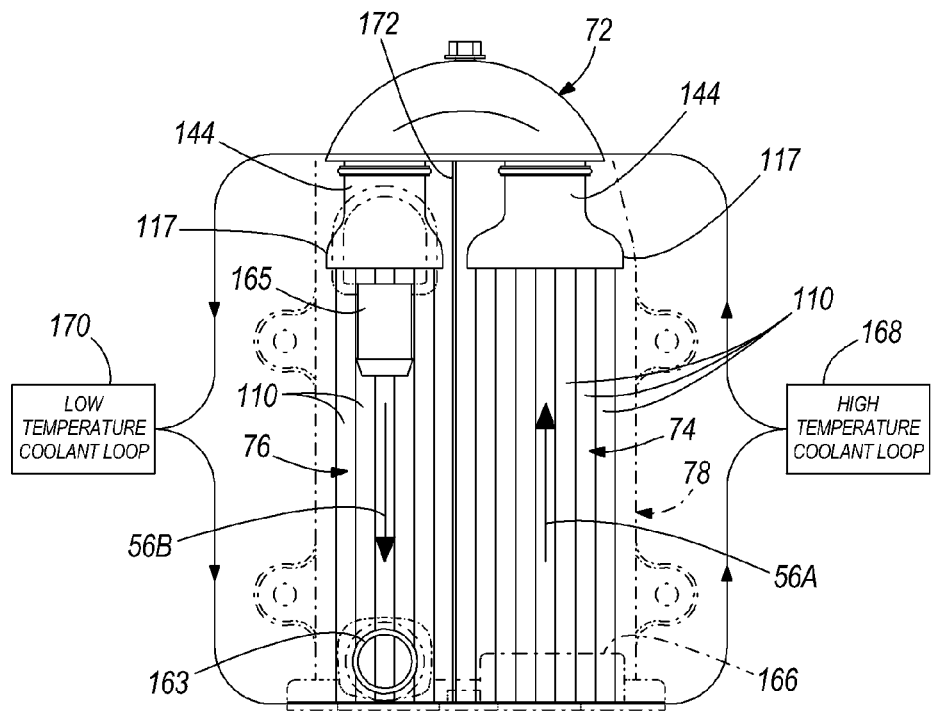
FIG. 9 is a plan view of the heat exchanger of FIG. 6, again with the coolant housing shown in phantom.

The coolant housing 78 of FIGS. 6-9 differs from that shown in FIGS. 2-5 in that it is preferably a cast or molded construction having a coolant chamber 160 that receives the cores 74 and 76, with an open end 162 that allows the cores 74 and 76 to be inserted into the chamber 160. The housing 78 also includes first and second coolant inlet ports 163 and 164, and first and second coolant outlet ports 165 and 166 for connection with first and second coolant loops 168 and 170, respectively, with the loop 168 preferably being a high temperature coolant loop and the loop 170 preferably being a low temperature coolant loop, as best seen in FIG. 9. A separating wall 172 is provided in the chamber 160 between the cores 74 and 76 to hydraulically isolate the coolant loops 168 and 170 from each other. It should be appreciated that localized differential thermal expansion can be minimized by passing higher temperature coolant from the loop 168 over the core 74 with the higher temperature exhaust flow, and by passing lower temperature coolant from the loop 170 over the core 76 with the lower temperature exhaust flow. It should also be appreciated that the embodiments of FIGS. 2-5 could easily be modified to accommodate the two coolant loops 168 and 170. Similarly, it should be appreciated that the embodiment of FIGS. 6-9 can easily be modified to accommodate a single coolant loop.

The open end 162 is closed by a header plate 173 that is common to both cores 74 and 76, with a gasket 174 sandwiched between the housing 78 and plate 172 to provide a seal for the coolant flow. If desired, the tank 122 and/or bypass valve 62 of FIGS. 2-5 can be assembled with the header plate 173 to form the inlet/exhaust manifold 70 for the embodiment of FIGS. 6-9. Furthermore, in the embodiment of FIGS. 6-9, the turning manifold 72 is provided in the form of a one-piece housing, preferably cast, rather than the two piece tank and header construction of FIGS. 2-5.

As best seen in FIG. 9, the core 76 is provided with fewer tubes 110 to reflect the change in density of the exhaust after being cooled in the pass 56A. This feature can also be easily be incorporated into the embodiments of FIGS. 2-5.

It should be appreciated that for all of the disclosed embodiments there are many possible modifications. For example, while both embodiments show the tubes 110 of both of the cores 74 and 76 being of the same length, in some applications it may be desirable for the tubes 110 of one of the cores 74,76 to be of a different length than the tubes 110 of the other core 74,76. Furthermore, in some applications, only one of the thermal expansion joints or devices 87 and 93 may be required, in which case one of the thermal expansion joints 87 and 93 would be eliminated so that the corresponding core 74 or 76 would be connected directly to its manifold.

The invention claimed is:

1. An exhaust gas cooler for use in an engine system including a combustion engine and a cooling system, the exhaust gas cooler configured to cool an exhaust gas flow of the combustion engine, the exhaust gas cooler comprising:
   a first pass;
   a second pass;
   an inlet/outlet manifold to direct the exhaust gas flow to the first pass and from the second pass;
   a turning manifold to direct the exhaust gas flow from the first pass to the second pass;
   a first exhaust gas core including a first plurality of tubes defining the first pass and a first transition piece including a first header plate that receives the first plurality of tubes and a first elongated extension that extends from the first header plate;
   a second exhaust gas core including a second plurality of tubes defining the second pass and a second transition piece including a second header plate that receives the second plurality of tubes and a second elongated extension that extends from the second header plate;

a coolant housing including a first end fixed to the inlet/outlet manifold and a second end fixed to the turning manifold, the coolant housing surrounds the first and second exhaust gas cores to direct at least one coolant flow past the first and second exhaust gas cores, the coolant housing further including a first opening adjacent the second end and a second opening adjacent the second end, the first elongated extension extends through the first opening of the coolant housing and the second elongated extension extends through the second opening of the coolant housing;

a first thermal expansion joint including a first O-ring seal disposed in the first opening to allow the first elongated extension of the first exhaust gas core to slide within the first opening thereby allowing the first exhaust gas core to expand with respect to the coolant housing; and a second thermal expansion joint including a second O-ring seal disposed in the second opening to allow the second elongated extension of the second exhaust gas core to slide within the second opening thereby allowing the second exhaust gas core to expand with respect to the coolant housing independently of the first exhaust gas core, wherein the coolant housing includes a third opening adjacent the first end of the coolant housing, the cooler further comprising a third header plate coupled to the coolant housing adjacent the first end and outside the coolant housing, wherein the first plurality of tubes each include a first end coupled to the first transition piece and a second end coupled to the third header plate, and wherein the second plurality of tubes each include a first end coupled to the second transition piece and a second end coupled to the third header plate such that the third header plate spans the first and second exhaust gas cores.

2. The cooler of claim 1 wherein the first and second cores extend parallel to each other and have equal lengths.

3. The cooler of claim 1 further comprising a by-pass valve mounted in the inlet/outlet manifold to allow selective bypassing of the exhaust gas around the first and second passes.

4. The cooler of claim 1 wherein the first elongated extension has a generally round cross-sectional shape, and wherein the second elongated extension has a generally round cross-sectional shape.

5. The cooler of claim 4 wherein the first opening has a generally round cross-sectional shape, and wherein the second opening has a generally round cross-sectional shape.

6. The cooler of claim 1 wherein the coolant housing further includes a first groove and a second groove, wherein the first O-ring seal is received in the first groove, and wherein the second O-ring seal is received in the second groove.

7. The cooler of claim 6 wherein the first groove surrounds the first opening, and wherein the second groove surrounds the second opening.

8. The cooler of claim 1 wherein the first opening and the second opening extend through the second end of the coolant housing.

9. The cooler of claim 8 wherein the turning manifold is removably coupled to the second end of the coolant housing.

10. The cooler of claim 1 wherein the coolant housing includes a separating wall between the first core and the second core to provide a first coolant loop for the first core and a second coolant loop for the second core.

11. A heat exchanger for transferring heat between a fluid flow and a coolant flow, the heat exchanger comprising:

a coolant housing including a first end, a second end, a first opening adjacent the second end and a second opening adjacent the second end, the coolant housing defining at least one coolant flow path through the heat exchanger;

a first core in the coolant housing and including a first end, a second end, a first transition piece at the second end and including a first header plate and a first elongated extension that extends from the first header plate and through the first opening of the coolant housing, the first core further including a first plurality of tubes coupled to the first header plate, the first plurality of tubes defining a first pass for the fluid flow through the coolant housing;

a second core in the coolant housing and including a first end, a second end, a first transition piece at the second end and including a second header plate and a second elongated extension that extends from the second header plate and through the second opening of the coolant housing, the second core further including a second plurality of tubes coupled to the second header plate, the second plurality of tubes defining a second pass for the fluid flow through the coolant housing;

a first manifold to direct the fluid flow to one of the first and second cores and to receive the fluid flow from the other of the first and second cores, the first manifold fixed to a the first end of the coolant housing;

a second manifold to receive the fluid flow from the one of the first and second cores and to direct fluid flow to the other of the first and second cores, the second manifold fixed to a the second end of the housing;

a first thermal expansion joint including a first O-ring seal disposed in the first opening of the coolant housing to allow the first elongated extension of the first exhaust gas core to slide within the first opening thereby allowing the first exhaust gas core to expand with respect to the coolant housing; and a second thermal expansion joint including a second O-ring seal disposed in the second opening of the coolant housing to allow the second elongated extension of the second exhaust gas core to slide within the second opening thereby allowing the second exhaust gas core to expand with respect to the coolant housing, wherein the coolant housing includes a third opening adjacent the first end of the coolant housing, the cooler further comprising a third header plate coupled to the coolant housing adjacent the first end, wherein the first plurality of tubes each include a first end coupled to the first transition piece and a second end rigidly coupled to the third header plate, and wherein the second plurality of tubes each include a first end coupled to the second transition piece and a second end rigidly coupled to the third header plate such that the third header plate spans the first and second exhaust gas cores.

12. The heat exchanger of claim 11 wherein the first and second cores extend parallel to each other and have equal lengths.

13. The heat exchanger of claim 11 further comprising a by-pass valve mounted in the first manifold to allow selective bypassing of the exhaust gas around the first and second passes.

14. The heat exchanger of claim 11 wherein the first elongated extension has a generally round cross-sectional shape, wherein the second elongated extension has a generally round cross-sectional shape, wherein the first opening has a generally round cross-sectional shape, and wherein the second opening has a generally round cross-sectional shape.

15. The heat exchanger of claim 11 wherein the coolant housing further includes a first groove and a second groove, wherein the first O-ring seal is received in the first groove, and wherein the second O-ring seal is received in the second groove.

16. The heat exchanger of claim 15 wherein the first groove surrounds the first opening, and wherein the second groove surrounds the second opening.

17. The heat exchanger of claim 11 wherein the turning manifold is removably coupled to the second end of the coolant housing.

18. The heat exchange of claim 11 wherein the coolant housing includes a separating wall between the first core and the second core to provide a first coolant loop for the first core and a second coolant loop for the second core.

* * * * *

UNITED STATES PATENT AND TRADEMARK OFFICE
CERTIFICATE OF CORRECTION

| | |
|---|---|
| PATENT NO. | : 8,794,299 B2 |
| APPLICATION NO. | : 11/711455 |
| DATED | : August 5, 2014 |
| INVENTOR(S) | : Robert J. Barfknecht et al. |

Page 1 of 1

It is certified that error appears in the above-identified patent and that said Letters Patent is hereby corrected as shown below:

In the Claims

In claim 11, column 8, line 16 replace [a first transition piece] with -- a second transition piece --.

Signed and Sealed this
Twenty-eighth Day of July, 2015

Michelle K. Lee
*Director of the United States Patent and Trademark Office*